United States Patent
Osada et al.

(10) Patent No.: US 8,217,544 B2
(45) Date of Patent: Jul. 10, 2012

(54) MOTOR-GENERATOR HAVING STATOR AND INNER AND OUTER ROTORS

(75) Inventors: Masahiko Osada, Okazaki (JP);
Shigeyuki Morimoto, Nagoya (JP)

(73) Assignee: Denso Corporation, Kariya (JP)

(*) Notice: Subject to any disclaimer, the term of this patent is extended or adjusted under 35 U.S.C. 154(b) by 276 days.

(21) Appl. No.: 12/700,340

(22) Filed: Feb. 4, 2010

(65) Prior Publication Data
US 2010/0207474 A1 Aug. 19, 2010

(30) Foreign Application Priority Data
Feb. 6, 2009 (JP) .................. 2009-026443

(51) Int. Cl.
*H02K 16/00* (2006.01)
(52) U.S. Cl. ....................................... 310/114
(58) Field of Classification Search ............ 310/112, 310/113, 114
See application file for complete search history.

(56) References Cited

U.S. PATENT DOCUMENTS

| | | | | |
|---|---|---|---|---|
| 6,590,312 B1 * | 7/2003 | Seguchi et al. | ............. | 310/266 |
| 7,030,528 B2 * | 4/2006 | Morgante | ................. | 310/112 |
| 7,250,702 B2 | 7/2007 | Abou Akar et al. | | |
| 2004/0239199 A1 * | 12/2004 | Qu et al. | ................. | 310/114 |
| 2005/0077802 A1 | 4/2005 | Toujima et al. | | |

FOREIGN PATENT DOCUMENTS

| | | |
|---|---|---|
| JP | A-11-341757 | 12/1999 |
| JP | A-2005-117870 | 4/2005 |
| JP | A-2006-520178 | 8/2006 |
| JP | A-2008-312288 | 12/2008 |

* cited by examiner

*Primary Examiner* — Nguyen N Hanh
(74) *Attorney, Agent, or Firm* — Oliff & Berridge, PLC

(57) ABSTRACT

A motor-generator has a stator including an annular stator core and stator windings wound on the stator core, an annular inner rotor located radially inward of the stator core, and an annular outer rotor located radially outward of the stator core. Each of the inner and outer rotors is made of a soft magnetic material or magnetic steel. The stator core consists of a plurality of stator core segments each being in the form of a tooth. The stator windings are wound on the stator core in a continuous distributed winding manner at a predetermined winding pitch. The outer rotor consists of a plurality of outer rotor segments each of which is magnetically polarized to have opposite polarities on opposite circumferential ends thereof. Each of the outer rotor segments is offset from the inner rotor by a predetermined electrical angle that corresponds to the winding pitch of the stator windings.

12 Claims, 8 Drawing Sheets

MOTOR-GENERATOR HAVING STATOR AND INNER AND OUTER ROTORS

CROSS-REFERENCE TO RELATED APPLICATION

This application is based on and claims priority from Japanese Patent Application No. 2009-26443, filed on Feb. 6, 2009, the content of which is hereby incorporated by reference in its entirety into this application.

BACKGROUND OF THE INVENTION

1. Technical Field of the Invention

The present invention relates generally to electric rotating machines. More particularly, the invention relates to a motor-generator for a hybrid vehicle, which includes a stator having an annular stator core and a stator coil wound on the stator core, an inner rotor located radially inward of the stator with an air gap formed therebetween, and an outer rotor located radially outward of the stator with an air gap formed therebetween.

2. Description of the Related Art

Japanese Patent First Publication No. 2008-312288 discloses a motor-generator for use in a hybrid vehicle.

Specifically, as shown in FIG. 1, a drive unit installed in the hybrid vehicle includes the motor-generator 100, a housing 200, a speed reducer 300, a differential mechanism 400, and a drive shaft-receiving portion 500.

The motor-generator 100 is an electric rotating machine that can function both as an electric motor and as an electric generator. The motor-generator 100 includes a rotating shaft 110 that is rotatably supported by the housing 200 via bearings 120, a rotor 130 mounted on the rotating shaft 110, and a stator 140 disposed to surround the rotor 130.

The rotor 130 includes a rotor core 131 and permanent magnets 132 embedded in the rotor core 131. The rotor core 131 is formed by laminating a plurality of magnetic material sheets, such as iron sheets and iron-alloy sheets. The permanent magnets 132 are located in close vicinity to the radially outer periphery of the rotor core 131 and spaced in the circumferential direction of the rotor core 131 at substantially equal intervals.

The stator 140 includes an annular stator core 141, a three-phase stator coil 142 mounted on the stator core 141, and bus bars 143 connected to the stator coil 142. The bus bars 143 are further connected to a power supply cable 220 via a terminal block 210 mounted to the housing 200. Consequently, the stator coil 142 is electrically connected to an external power source 230 via the bus bars 143, the terminal block 210, and the power supply cable 220.

The stator core 141 is formed by laminating a plurality of magnetic material sheets, such as iron sheets and iron-alloy sheets. The stator coil 142 consists of U-phase, V-phase, and W-phase stator windings that are wound on the stator core 141 so as to be offset from each other in the circumferential direction of the stator core 141. The bus bars 143 include U-phase, V-phase, and W-phase bus bars that are respectively connected to the U-phase, V-phase, and W-phase stator windings of the stator coil 142.

The power supply cable 220 is a three-phase cable that consists of U-phase, V-phase, and W-phase cables. The U-phase, V-phase, and W-phase cables are respectively connected to the U-phase, V-phase, and W-phase bus bars 143.

When the hybrid vehicle operates in a normal running mode, the torque that is generated by the motor-generator 100 in its motor mode is transmitted to the drive shaft-receiving portion 500 via the speed reducer 300 and the differential mechanism 400. The torque transmitted to the drive shaft-receiving portion 500 is further transmitted to drive wheels of the hybrid vehicle via a draft shaft (not shown) received by the drive-shaft receiving portion 500, thereby driving the vehicle to run.

Moreover, when the hybrid vehicle operates in a regenerative braking mode, the drive wheels of the vehicle are rotated by the inertial force of the vehicle. In this case, the motor-generator 100 operates in its generator mode to generate electric power with the torque that is transmitted from the drive wheels to the motor-generator 100 via the drive shaft, the drive-shaft receiving portion 500, the differential mechanism 400, and the speed reducer 300. The electric power generated by the motor-generator 100 is then stored in a battery (not shown) of the vehicle via an inverter (not shown).

FIG. 2 shows a cross-section of the stator 140 perpendicular to the axial direction of the stator core 141. As seen from FIG. 2, the stator core 141 includes a plurality of stator teeth 141A that are arranged in the circumferential direction of the stator core 141 at equal intervals. Around each of the stator teeth 141A, there is wound one of the U-phase, V-phase, and W-phase stator windings of the stator coil 142 via an insulator 144A. That is to say, the stator 140 is a so-called concentrated winding stator.

Moreover, as shown in FIG. 2, the stator core 141 further includes a back core portion 141B that are located radially outside of the stator teeth 141A to connect all of the stator teeth 141A together. However, with the back core portion 141B, the radial size of the stator core 141 is increased, thereby making it difficult to downsize the motor-generator 100.

SUMMARY OF THE INVENTION

The present invention has been made in view of the above-mentioned problem.

According to the present invention, there is provided a motor-generator which includes a stator, an annular inner rotor, and an annular outer rotor. The stator includes an annular stator core and stator windings wound on the stator core. The inner rotor is located radially inward of the stator core with a first air gap formed between the inner rotor and the stator core. The outer rotor is located radially outward of the stator core with a second air gap formed between the outer rotor and the stator core. Further, in the motor-generator, each of the inner and outer rotors is made of a soft magnetic material or magnetic steel. The stator core consists of a plurality of stator core segments each of which is in the form of a tooth. The stator windings are wound on the stator core in a continuous distributed winding manner at a predetermined winding pitch. The outer rotor consists of a plurality of outer rotor segments each of which is magnetically polarized to have opposite polarities on opposite circumferential ends thereof. Each of the outer rotor segments is offset from the inner rotor by a predetermined electrical angle that corresponds to the winding pitch of the stator windings.

With the above double rotor structure composed of the inner and outer rotors, it becomes unnecessary for the stator core to include a back core portion as in the case of the conventional motor-generator shown in FIGS. 1 and 2. Consequently, the radial size of the stator core can be reduced, thereby making it possible to downsize the motor-generator.

Moreover, with the above double rotor structure, the motor-generator can generate a higher torque than a general motor or motor-generator that has only an inner rotor.

In one preferred embodiment of the invention, each of the outer rotor segments has a pair of notches that are respectively formed at the circumferential ends of the outer rotor segment. There are provided a plurality of retaining members each of which has a pair of protrusions that are respectively formed at an opposite pair of ends of the retaining member. Each of the retaining members is interposed between one circumferentially-adjacent pair of the outer rotor segments with its protrusions respectively fitted into a corresponding one of the notches of the pair of the outer rotor segments.

With the above configuration, when a centrifugal force acts on each of the outer rotor segments during operation of the motor-generator, the protrusions of the retaining members engage with the corresponding notches of the outer rotor segments, thereby securely retaining the outer rotor segments against the centrifugal force.

Further, each of the retaining members is preferably made of a magnetic material. Consequently, the retaining members can be magnetically polarized by the outer rotor segments in the circumferential direction of the outer rotor, thereby increasing the torque generated by the motor-generator and more securely retaining the outer rotor segments.

In another preferred embodiment of the invention, there is provided an annular connecting member that mechanically connects the inner rotor to the outer rotor, with each of the outer rotor segments offset from the inner rotor by an optimal electrical angle at which the torque generated by the motor-generator 1 becomes maximum. Consequently, the inner and outer rotors are fixed together so that they can rotate together during operation of the motor-generator.

The connecting member may be made of a nonmagnetic material. In this case, it is possible to prevent magnetic interference between the inner and outer rotors.

Otherwise, the connecting member may be made of a magnetic material. In this case, it is possible to utilize the magnetic leakage from the inner and outer rotors.

In yet another preferred embodiment of the invention, for each of the stator core segments, there are provided a plurality of core end tips each of which is located on one of the radially inner and outer sides of the stator core segment and axially protrudes from one of the axial end surfaces of the stator core segment. The protruding height of the core end tips is greater than that of end portions of the stator windings, the end portions of the stator windings axially protruding from the axial end surfaces of the stator core segments.

With such core end tips, it is possible to prevent the end portions of the stator windings from interfering with the connecting member that connects the inner rotor to the outer rotor. In addition, the core end tips may be utilized as part of the magnetic circuit of the motor-generator, thereby increasing the torque generated by the motor-generator.

In still another preferred embodiment of the invention, a plurality of protrusions are formed on an inner side surface of the annular connecting member to face the stator windings through an air gap formed therebetween. The protrusions are arranged in the circumferential direction of the stator core at predetermined intervals. Each of the protrusions is made of a permanent magnet or a magnetic material.

With the protrusions, the magnetoresistance between the connecting member and the stator windings is made to change in the circumferential direction of the stator core, thereby increasing the torque generated by the motor-generator.

In still yet another preferred embodiment of the invention, each of the stator windings is divided into a plurality of sub-windings. There is provided a connection control means that controls the electrical connection and separation between the sub-windings of each of the stator windings, thereby selectively forming the stator winding with all or part of the sub-windings. Consequently, it is possible to more suitably control the motor-generator according to the operating condition of the vehicle.

In another preferred embodiment of the invention, there are provided a plurality of coils each of which is wound, in a concentrated winding manner, around a radially outer end portion of one of the stator core segments. Consequently, when, for example, it is necessary for the motor-generator to generate high torque to accelerate the vehicle, it is possible to conduct a weak field control by supplying electric current the coils.

In yet another preferred embodiment of the invention, for each of the stator core segments, there is fixed a bar-shaped protruding member on an axial end surface of the stator core segment. The protruding member protrudes radially inward from the stator core segment with an air gap formed between the protruding member and the inner rotor. Consequently, it is possible to fix the stator core segments by fixing the protruding member to, for example, a frame of the motor-generator.

Preferably, the second air gap between the outer rotor and the stator core is set to be less than the first air gap between the inner rotor and the stator core.

Consequently, when the outer rotor expands radially outward during high-speed rotation, the second air gap may be increased to become approximately equal to the first air gap. As a result, it is possible to prevent the second air gap from becoming much greater than the first air gap and thereby causing magnetic saturation.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
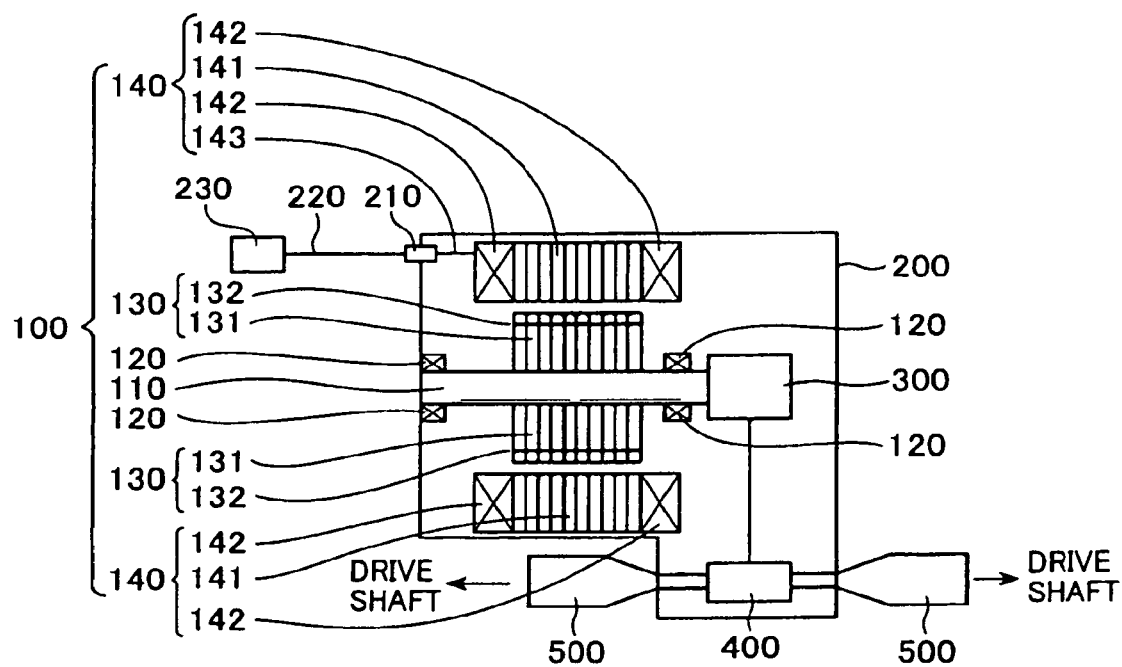
FIG. 1 is a schematic view showing the overall configuration of a drive unit of a hybrid vehicle which includes a conventional motor-generator.

Preferred embodiments of the present invention will be described hereinafter with reference to FIGS. 3A-11B.

It should be noted that, for the sake of clarity and understanding, identical components having identical functions in different embodiments of the invention have been marked, where possible, with the same reference numerals in each of the figures.

First Embodiment

Figure 3A:
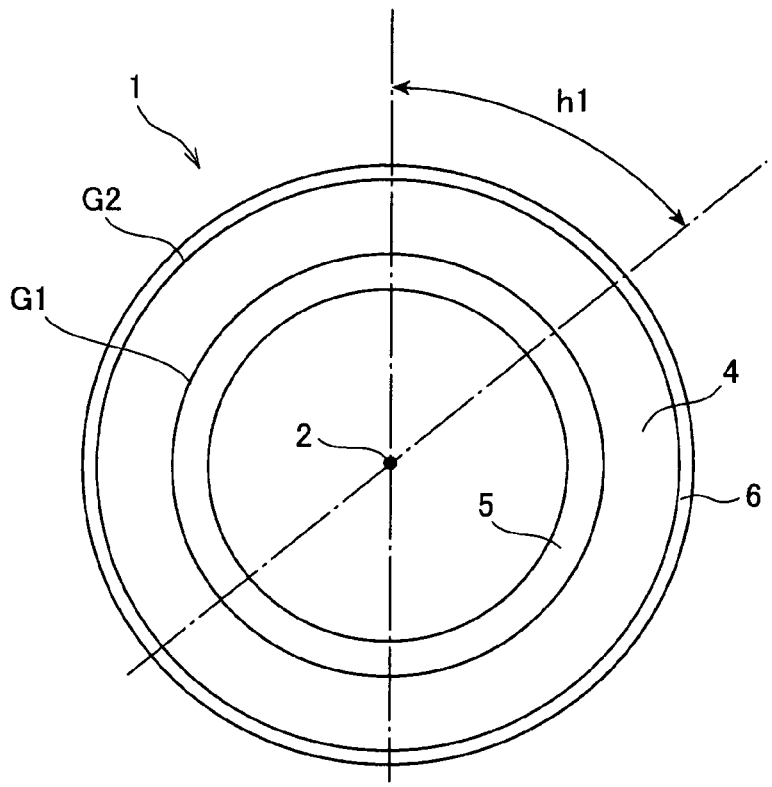
FIG. 3A is a schematic view of a motor-generator according to the first embodiment of the invention along the axial direction of a rotating shaft of the motor generator.
Figure 3B:
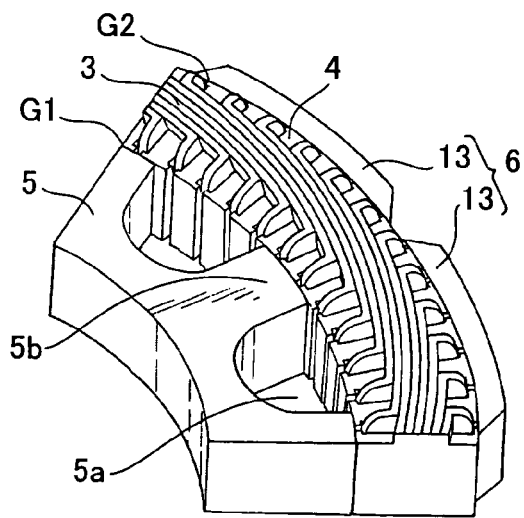
FIG. 3B is a perspective view of a sector h1 of the motor-generator designated with chain lines in FIG. 3A.

FIGS. 3A-3B show the configuration of a motor-generator 1 according to the first embodiment of the invention.

The motor-generator 1 is an electric rotating machine that can function both as an electric motor and as an electric generator. In the present embodiment, the motor-generator 1 is designed to be used in, for example, a hybrid vehicle.

As shown in FIGS. 3A-3B, the motor-generator 1 includes a rotating shaft 2, a three-phase stator coil 3, an annular stator core 4, an annular inner rotor 5, and an annular outer rotor 6. The stator coil 3 is wound on the stator core 4. The stator coil 3 and the stator core 4 together constitute a stator of the motor-generator 1. The inner rotor 5 is mounted on the rotating shaft 2 and located radially inward of the stator core 4 with a first air gap G1 formed between the stator core 4 and the inner rotor 5. On the other hand, the outer rotor 6 is located radially outward of the stator core 4 with a second air gap G2 formed between the stator core 4 and the outer rotor 6. In the present embodiment, each of the inner and outer rotors 5 and 6 is made of a soft magnetic material or magnetic steel.

The stator core 4 consists of a plurality of stator core segments 11 each of which is provided in the form of a tooth. Further, each of the stator core segments 11 is slightly tapered radially inward to have a fan-like shape.

The stator coil 3 consists of a U-phase stator winding, a V-phase stator winding, and a W-phase stator winding and is wound on the stator core 4 in a continuous distributed winding manner at a predetermined winding pitch.

Here, the continuous distributed winding manner denotes a winding manner in which: each of the U-phase, V-phase, and W-phase stator windings of the stator coil 3 is formed with a single continuous electric wire; the U-phase stator winding is wound around the outer periphery of each of a plurality of first stator core segment groups, each of the first stator core segment groups including N circumferentially-adjacent stator core segments 11, where N is a predetermined integer; the V-phase stator winding is wound around the outer periphery of each of a plurality of second stator core segment groups, each of the second stator core segment groups also including N circumferentially-adjacent stator core segments 11; the W-phase stator winding is wound around the outer periphery of each of a plurality of third stator core segment groups, each of the third stator core segment groups also including N circumferentially-adjacent stator core segments 11; the first, second, and third stator core segment groups are offset from each other in the circumferential direction of the stator core 4; and the U-phase, V-phase, and W-phase stator windings are extended crossing over each other. In addition, the circumferential length of each of the first, second, and third stator core segment groups represents the predetermined winding pitch of the stator coil 3 (i.e., the predetermined winding pitch of the U-phase, V-phase, and W-phase stator windings).

The inner rotor 5 has a plurality of recesses 5a formed in the radially outer surface thereof. Each of the recesses 5a extends in the axial direction of the rotating shaft 2 over the entire axial length of the inner rotor 5 and has a substantially U-shaped cross-section perpendicular to the axial direction. The recesses 5a are arranged in the circumferential direction of the rotating shaft 2 at predetermined intervals. The inner rotor 5 also has a plurality of protrusions 5b each of which is formed between one circumferentially-adjacent pair of the recesses 5a. Further, each of the protrusions 5b is magnetically polarized in the circumferential direction of the rotating shaft 2 so as to have opposite pluralities on the opposite circumferential ends thereof.

The outer rotor 5 consists of a plurality of arc-shaped outer rotor segments 13 that are fixed together by, for example, resin insert-molding. Each of the outer rotor segments 13 is also magnetically polarized so as to have opposite polarities on the opposite circumferential ends thereof. Further, the outer rotor segments 13 are arranged in the circumferential direction of the rotating shaft 2 at predetermined intervals so that the facing ends of each circumferentially-adjacent pair of the outer rotor segments 13 have opposite polarities.

Figure 3C:
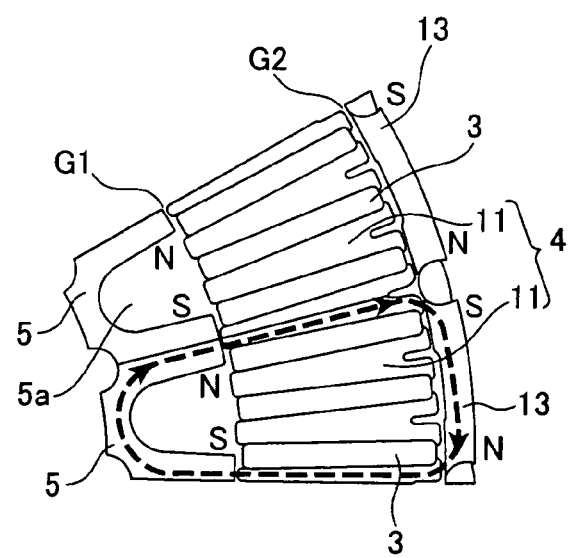
FIG. 3C is a schematic plan view of the sector h1 of the motor-generator.

In the present embodiment, as shown in FIG. 3C, each of the outer rotor segments 13 is arranged in the circumferential direction of the stator core 4 (or in the circumferential direction of the rotating shaft 2) so that: the circumferential ends of the outer rotor segment 13 are respectively radially aligned with two circumferentially-adjacent protrusions 5b of the inner rotor 5; and each radially-aligned pair of the circumferential ends and the protrusions 5b have opposite polarities. In other words, each of the outer rotor segments 13 is offset from the inner rotor 5 by an electrical angle of 180°. Furthermore, in the present embodiment, the predetermined winding pitch of the stator coil 3 is also set to correspond to an electrical angle of 180°.

With the above arrangement of the inner and outer rotors 5 and 6, when the stator coil 3 is energized to induce a magnetic flux, the magnetic flux will flow through a magnetic circuit as shown in FIG. 3C. More specifically, the magnetic flux first flows out of a first one of the stator core segments 11, then sequentially passes through the second air gap G2, one of the outer rotor segments 13, the second air gap G2, a second one of the stator core segments 11, the first air gap G1, the inner rotor 5, the first air gap G1, and finally returns to the first stator core segment 11.

Figure 2:
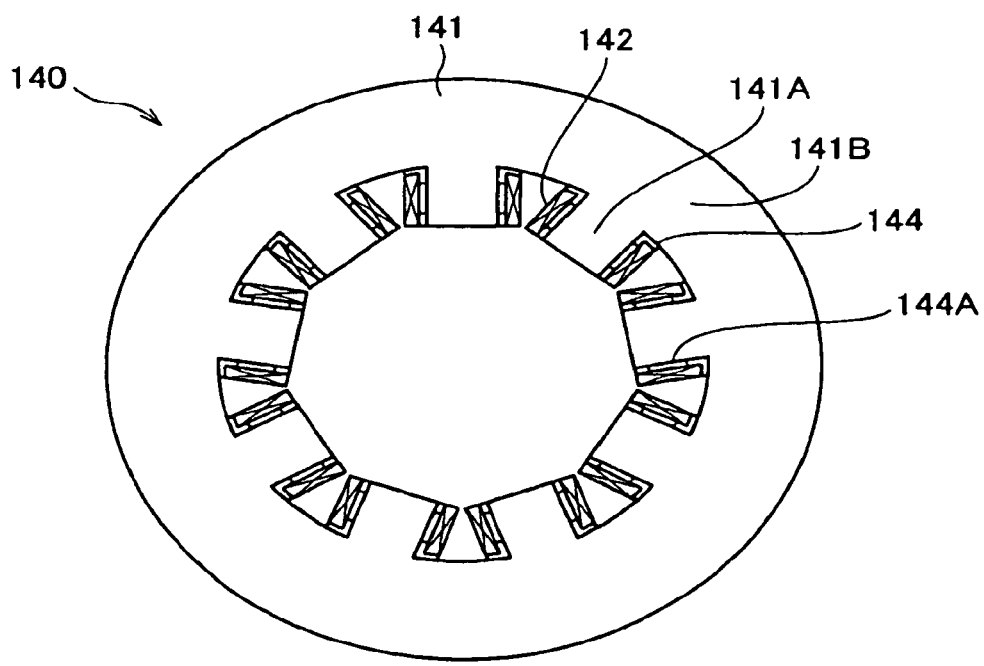
FIG. 2 is a schematic cross-sectional view of a stator of the conventional motor-generator.

With the above double rotor structure composed of the inner and outer rotors 5 and 6 according to the present embodiment, it becomes unnecessary for the stator core 4 to include a back core portion as in the case of the conventional motor-generator shown in FIGS. 1 and 2. Consequently, the radial size of the stator core 4 can be reduced, thereby making it possible to downsize the motor-generator 1.

Moreover, with the above double rotor structure, the motor-generator 1 can generate a higher torque than a general motor or motor-generator that has only an inner rotor.

Second Embodiment

This embodiment illustrates a manner of securely retaining the out rotor segments 13.

Figure 4:
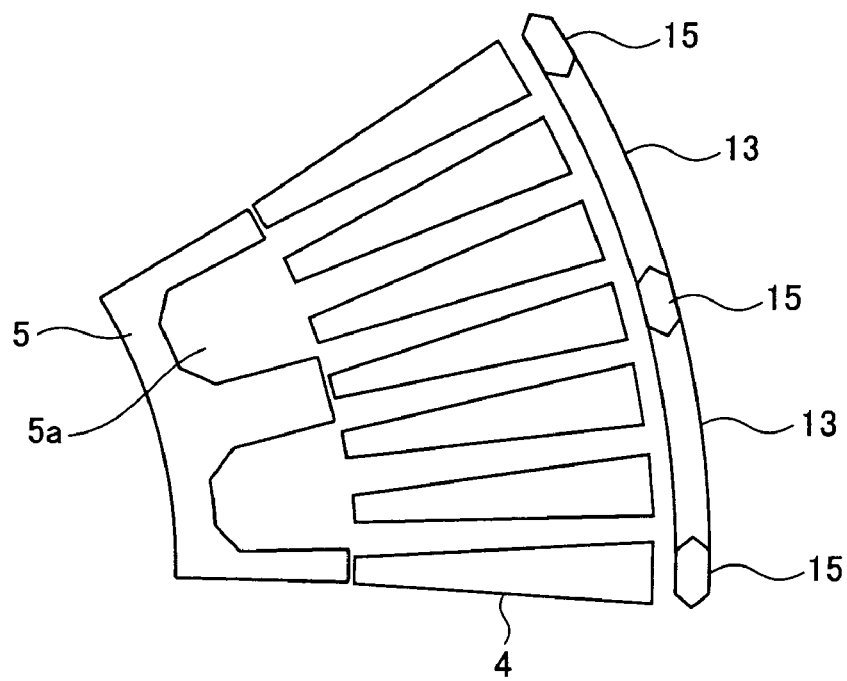
FIG. 4 is a schematic plan view of a sector of a motor-generator according to the second embodiment of the invention.

As shown in FIG. 4, in the present embodiment, each of the outer rotor segments 13 has a pair of V-shaped notches that are respectively formed at the circumferential ends of the outer rotor segment 13.

Further, there are provided a plurality of retaining members 15 for securely retaining the outer rotor segments 13. Specifically, each of the retaining members 15 has a pair of V-shaped protrusions that are respectively formed at an opposite pair of ends of the retaining member 15. Each of the retaining members 15 is interposed between one circumferentially-adjacent pair of the outer rotor segments 13 with its protrusions respectively fitted into a corresponding one of the notches of the pair of the outer rotor segments 13.

During operation of the motor-generator 1, a centrifugal force will act on each of the outer rotor segments 13. However, according to the present embodiment, the protrusions of the retaining members 15 engage with the corresponding notches of the outer rotor segments 13, thereby securely retaining the outer rotor segments 13 against the centrifugal force.

Modification

Figure 5:
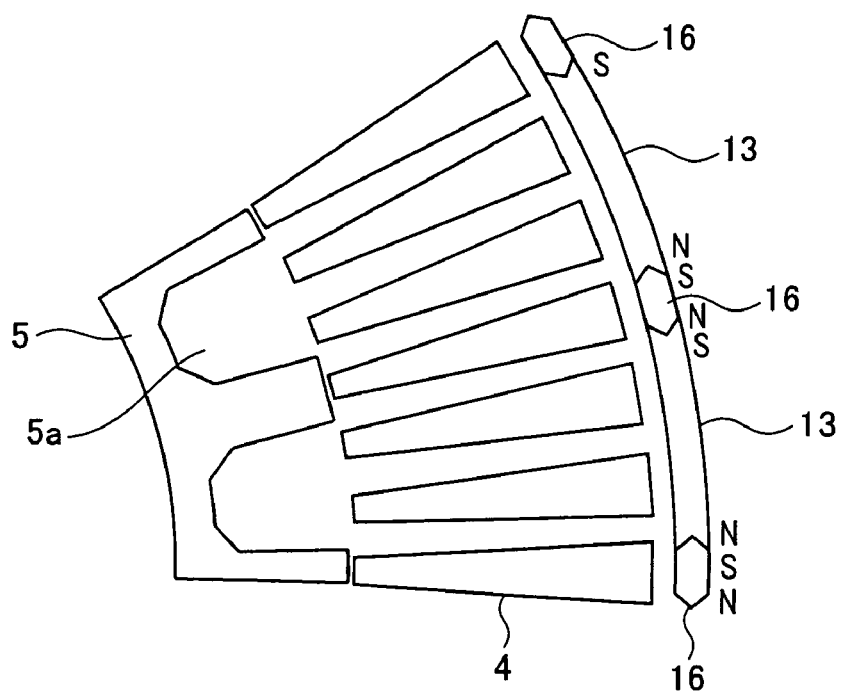
FIG. 5 is a schematic plan view illustrating a modification of the motor-generator according to the second embodiment.

As shown in FIG. 5, in this modification, each of the retaining members 16 for retaining the outer rotor segments 13 is made of a magnetic material. Consequently, the retaining members 16 are magnetically polarized by the outer rotor segments 13 in the circumferential direction of the outer rotor 6, thereby increasing the torque generated by the motor-generator 1 and more securely retaining the outer rotor segments 13.

Third Embodiment

This embodiment illustrates a manner of fixing the inner and outer rotors 5 and 6 together.

Figure 6A:
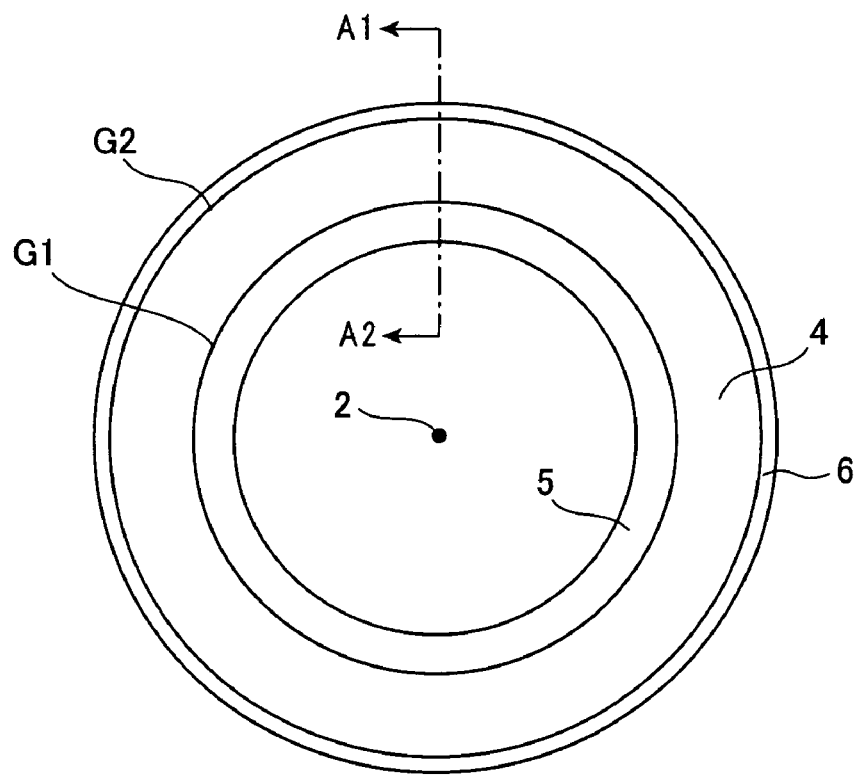
FIG. 6A is a schematic view of a motor-generator according to the third embodiment of the invention along the axial direction of a rotating shaft of the motor generator.
Figure 6B:
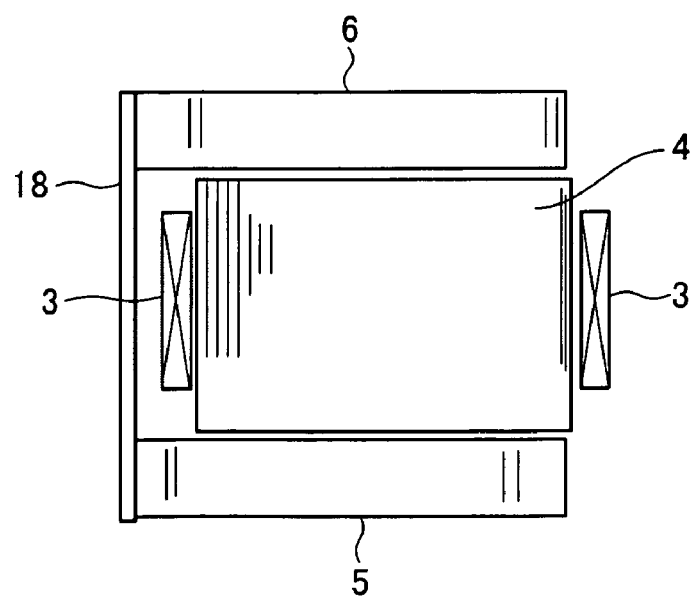
FIG. 6B is a schematic cross-sectional view taken along the line A1-A2 in FIG. 6A.

As shown in FIGS. 6A-6B, in the present embodiment, there is provided an annular connecting member 18 for fixing the inner rotor 5 to the outer rotor 6.

Specifically, the connecting member 18 mechanically connects the inner rotor 5 to the outer rotor 6, with each of the outer rotor segments 13 offset from the inner rotor 5 by an optimal electrical angle at which the torque generated by the motor-generator 1 becomes maximum. Consequently, the inner and outer rotors 5 and 6 are fixed together so that they can rotate together during operation of the motor-generator 1. In addition, the optimal electric angle is generally equal to 180°, but may be changed according to the design specification of the motor-generator 1.

Furthermore, the connecting member 18 may be made of either a nonmagnetic material or a magnetic material. When the connecting member 18 is made of a nonmagnetic material, it is possible to prevent magnetic interference between the inner and outer rotors 5 and 6. Otherwise, when the connecting member 18 is made of a magnetic material, it is possible to utilize the magnetic leakage from the inner and outer rotors 5 and 6.

Fourth Embodiment

This embodiment illustrates a manner of dividing each of the U-phase, V-phase, and W-phase stator windings of the stator coil 3 into a plurality of sub-windings so as to more suitably control the motor-generator 1.

Figure 7:
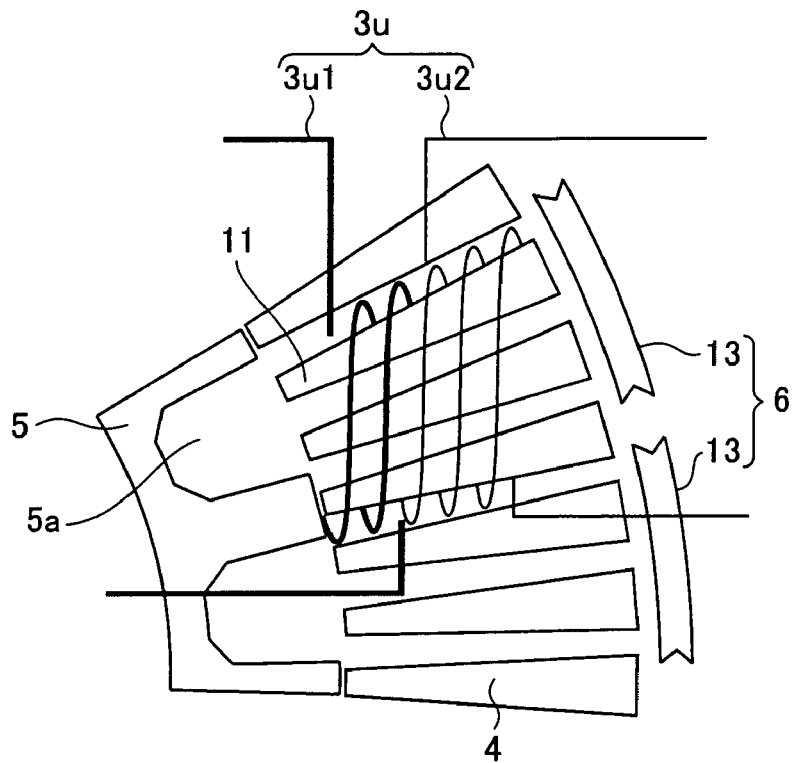
FIG. 7 is a schematic plan view of a sector of a motor-generator according to the fourth embodiment of the invention.

As shown in FIG. 7, in the present embodiment, the U-phase stator winding $3u$ of the stator coil 3 is divided into two sub-windings $3u1$ and $3u2$. Similarly, though not shown in the figures, the V-phase stator winding $3v$ of the stator coil 3 is also divided into two sub-windings $3v1$ and $3v2$; the W-phase stator winding $3w$ of the stator coil 3 is also divided into two sub-windings $3w1$ and $3w2$.

Further, a connection control means (not shown) is provided which controls the electrical connection and separation between the sub-windings of each of the U-phase, V-phase, and W-phase stator windings $3u$, $3v$, and $3w$. More specifically, under control of the connection control means, the sub-windings $3u1$, $3v1$, and $3w1$ can be respectively electrically connected to or separated from the sub-windings $3u2$, $3v2$, and $3w3$.

For example, during a start operation or low-speed running of the vehicle, the sub-windings $3u1$, $3v1$, and $3w1$ are respectively electrically connected to the sub-windings $3u2$, $3v2$, and $3w2$ to form the U-phase, V-phase, and W-phase stator windings $3u$, $3v$, and $3w$. Consequently, both the resistance and inductance of each of the stator windings $3u$, $3v$, and $3w$ becomes high. As a result, the reactance of each of the stator windings $3u$, $3v$, and $3w$ accordingly becomes high, allowing the motor-generator 1 to generate high torque.

On the other hand, during high-speed running of the vehicle, the sub-windings $3u1$, $3v1$, and $3w1$ are respectively electrically separated from the sub-windings $3u2$, $3v2$, and $3w2$, and only either the sub-windings $3u1$, $3v1$, and $3w1$ or the sub-windings $3u2$, $3v2$, and $3w2$ are selected to form the U-phase, V-phase, and W-phase stator windings $3u$, $3v$, and $3w$ of the stator coil 3. Consequently, both the resistance and inductance of each of the stator windings $3u$, $3v$, and $3w$ becomes low. As a result, the reactance of each of the stator windings $3u$, $3v$, and $3w$ accordingly becomes low, allowing the motor-generator 1 to rotate at high speed.

Accordingly, with the above configuration of the stator coil 3, it is possible to more suitably control the motor-generator 1 according to the operating condition of the vehicle.

Fifth Embodiment

This embodiment illustrates a manner of conducting a weak field control in the motor-generator 1.

Figure 8:
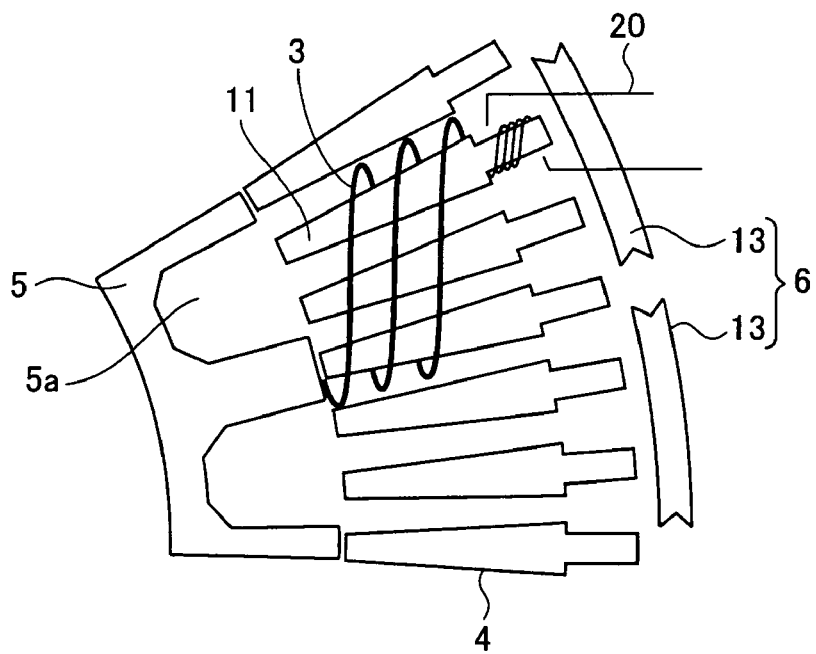
FIG. 8 is a schematic plan view of a sector of a motor-generator according to the fifth embodiment of the invention.

As shown in FIG. 8, in the present embodiment, each of the stator core segments 11 is stepped to have almost the same circumferential width at the radially inner and outer ends. Further, for each of the stator core segment groups, a coil 20 is wound, in a concentrated winding manner, around a radially outer end portion of one of the stator core segments 11 in the stator core segment group. In addition, as previously described in the first embodiment, each of the stator core segment groups includes N circumferentially-adjacent stator core segments 11 and has one of the U-phase, V-phase, and W-phase stator windings of the stator coil 3 wound around the outer periphery thereof.

In the present embodiment, the weak field control is conducted by supplying electric current to the coils 20. More specifically, when the motor-generator 1 rotates at high speed and thus the counter-electromotive force induced in the stator coil 3 becomes high, the difference between the terminal voltage of the battery and the counter-electromotive force accordingly becomes small. Consequently, without the weak field control, the electric current flowing through the stator coil 3 would be reduced, thereby reducing the torque generated by the motor-generator 1. However, by supplying electric current to the coils 20, it is possible to partially cancel the magnetic flux created by the inner and outer rotors 5 and 6 with the magnetic flux created by the coils 20, thereby lowering the counter-electromotive force induced in the stator coil 3. As a result, it is possible to prevent the electric current flowing through the stator coil 3 from being reduced, thereby allowing the motor-generator 1 to generate high torque at high speed.

In addition, the weak field control according to the present embodiment may be conducted when, for example, it is necessary for the motor-generator 1 to generate high torque to accelerate the vehicle.

Sixth Embodiment

This embodiment illustrates a manner of fixing the stator core segments 11.

Figure 9A:
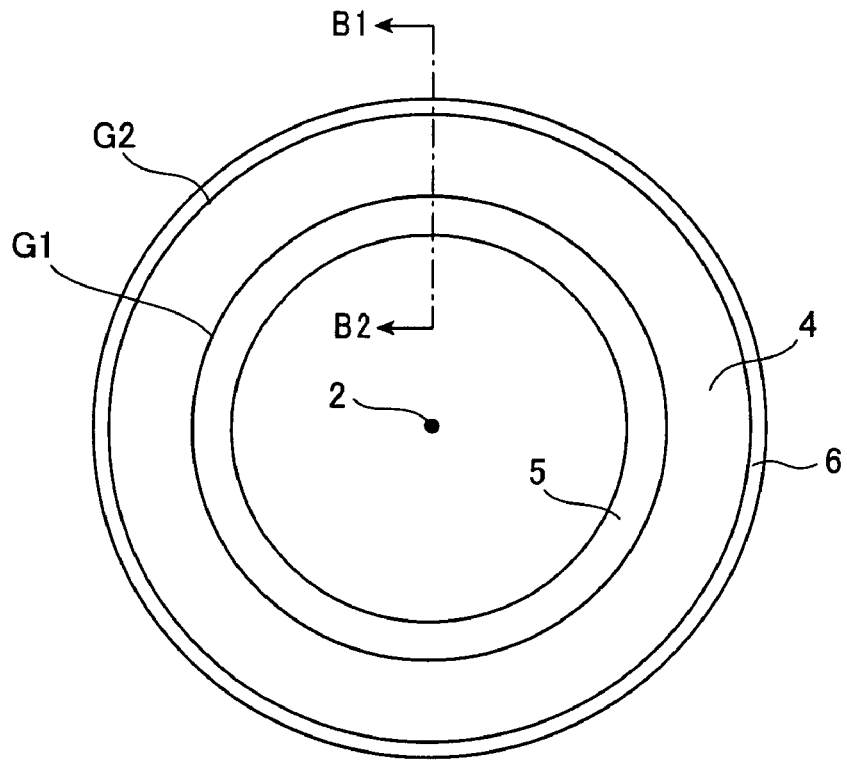
FIG. 9A is a schematic view of a motor-generator according to the sixth embodiment of the invention along the axial direction of a rotating shaft of the motor generator.
Figure 9B:
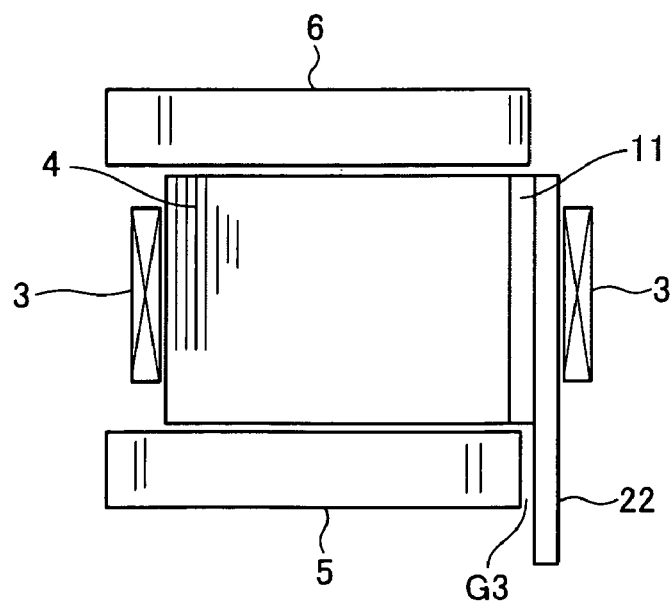
FIG. 9B is a schematic cross-sectional view taken along the line B1-B2 in FIG. 9A.

As shown in FIGS. 9A-9B, in the present embodiment, for each of the stator core segments 11, there is fixed a bar-shaped protruding member 22 on an axial end surface of the stator core segment 11. The protruding member 22 protrudes radially inward from the stator core segment 11 with a third air gap G3 formed between the protruding member 22 and the inner rotor 5 for securing safety.

Moreover, though not shown in the figures, the protruding member 22 is further fixed to, for example, a frame of the motor-generator 1, thereby fixing the stator core segment 11 to the frame.

Seventh Embodiment

This embodiment illustrates a manner of preventing interference between the stator coil 3 and the annular connecting member 18 that connects the inner rotor 5 to the outer rotor 6.

Figure 10A:
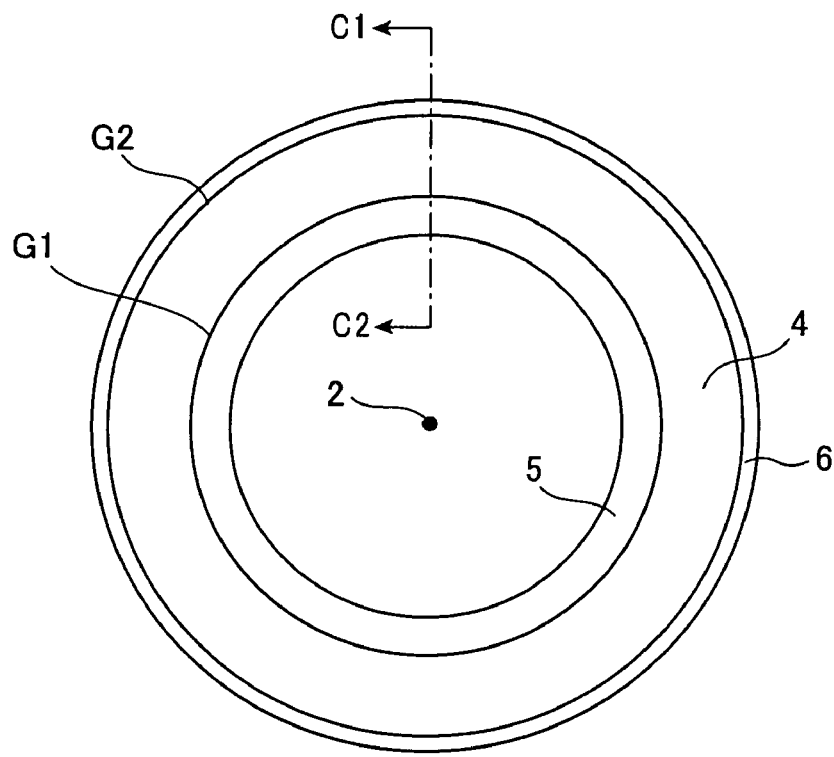
FIG. 10A is a schematic view of a motor-generator according to the seventh embodiment of the invention along the axial direction of a rotating shaft of the motor generator.
Figure 10B:
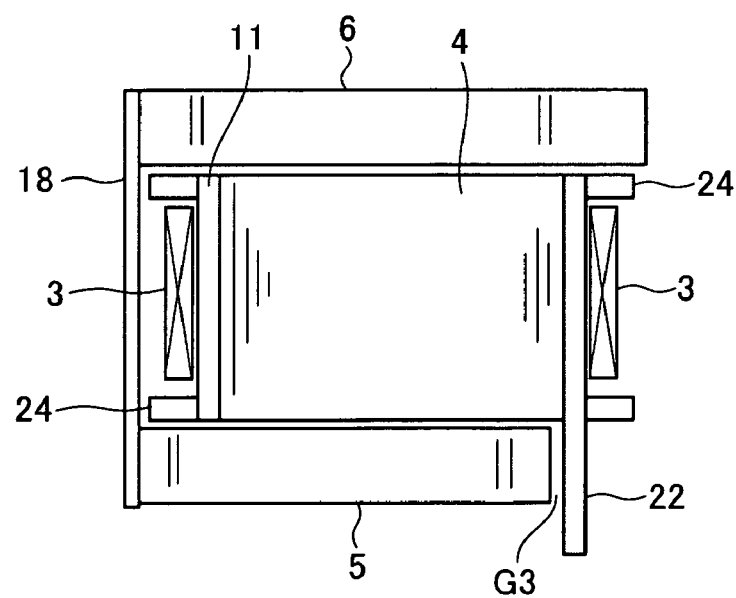
FIG. 10B is a schematic cross-sectional view taken along the line C1-C2 in FIG. 10A.

As shown in FIGS. 10A and 10B, in the present embodiment, for each of the stator core segments 11, there are provided four core end tips 24 each of which is located on one of the radially inner and outer sides of the stator core segment 11 and axially protrudes from one of the axial end surfaces of the stator core segment 11. Further, the protruding height of the core end tips 24 from the axial end surfaces of the stator core segments 11 is greater than that of the coil ends of the stator coil 3 (i.e., the end portions of the stator coil 3 axially protruding from the axial end surfaces of the stator core segments 11).

With such core end tips 24, it is possible to prevent the coil ends of the stator coil 3 from interfering with the connecting member 18 that connects the inner rotor 5 to the outer rotor 6. In addition, the core end tips 24 may be utilized as part of the magnetic circuit of the motor-generator 1, thereby increasing the torque generated by the motor-generator 1.

Eighth Embodiment

This embodiment illustrates a manner of increasing the torque generated by the motor-generator 1.

Figure 11A:
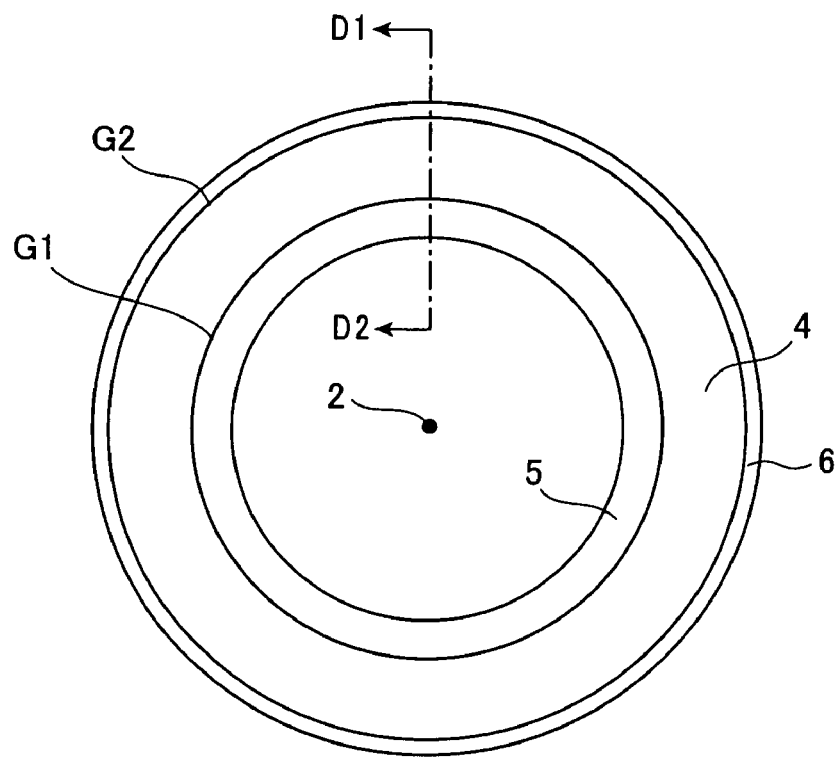
FIG. 11A is a schematic view of a motor-generator according to the eighth embodiment of the invention along the axial direction of a rotating shaft of the motor generator.
Figure 11B:
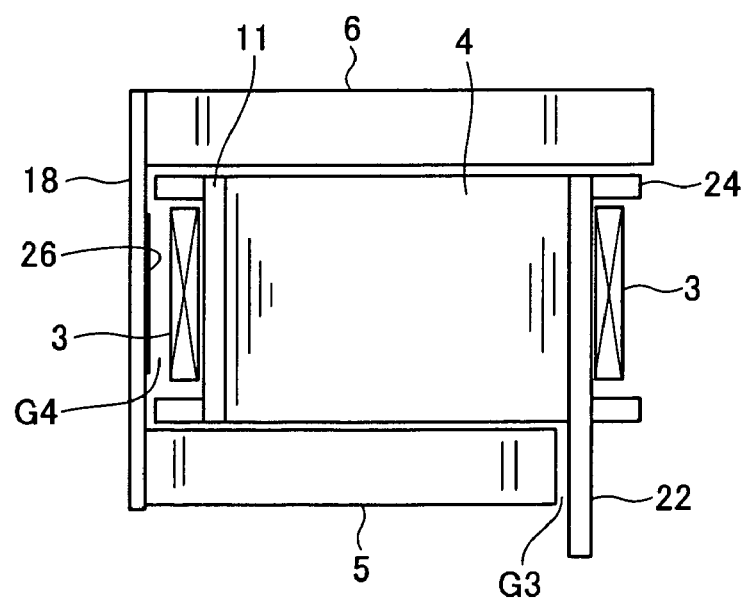
FIG. 11B is a schematic cross-sectional view taken along the line D1-D2 in FIG. 11A.

As shown in FIGS. 11A and 11B, in the present embodiment, a plurality of protrusions 26 are formed on an inner side surface of the annular connecting member 18 to face the stator coil 3 through a fourth air gap G4 formed therebetween. The protrusions 26 are arranged in the circumferential direction of the stator core 4 at predetermined intervals. In addition, each of the protrusions 26 is made of a permanent magnet or a magnetic material.

With the protrusions 26, the magnetoresistance between the connecting member 18 and the stator coil 3 is made to change in the circumferential direction of the stator core 4, thereby increasing the torque generated by the motor-generator 1.

While the above particular embodiments of the present invention have been shown and described, it will be understood by those skilled in the art that various modifications, changes, and improvements may be made without departing from the spirit of the invention.

For example, in the previous embodiments, the second air gap G2 between the stator core 4 and the outer rotor 6 may be set to be less than the first air gap G1 between the stator core 4 and the inner rotor 5. More particularly, the second air gap G2 may be set to be approximately equal to 70% of the first air gap G1. In this case, when the outer rotor 6 expands radially outward during high-speed rotation, the second air gap G2 will be increased to become approximately equal to the first air gap G1. As a result, it is possible to prevent the second air gap G2 from becoming much greater than the first air gap G1 and thereby causing magnetic saturation.

What is claimed is:

1. A motor-generator comprising:
   a stator including an annular stator core and stator windings wound on the stator core;
   an annular inner rotor located radially inward of the stator core with a first air gap formed between the inner rotor and the stator core; and
   an annular outer rotor located radially outward of the stator core with a second air gap formed between the outer rotor and the stator core,
   wherein
   each of the inner and outer rotors is made of a soft magnetic material or magnetic steel,
   the stator core consists of a plurality of stator core segments each of which is in the form of a tooth,
   the stator windings are wound on the stator core in a continuous distributed winding manner at a predetermined winding pitch,
   the outer rotor consists of a plurality of outer rotor segments each of which is magnetically polarized to have opposite polarities on opposite circumferential ends thereof, and
   each of the outer rotor segments is offset from the inner rotor by a predetermined electrical angle that corresponds to the winding pitch of the stator windings.

2. The motor-generator as set forth in claim 1, wherein each of the outer rotor segments has a pair of notches that are respectively formed at the circumferential ends of the outer rotor segment,
   there are provided a plurality of retaining members each of which has a pair of protrusions that are respectively formed at an opposite pair of ends of the retaining member, and
   each of the retaining members is interposed between one circumferentially-adjacent pair of the outer rotor segments with its protrusions respectively fitted into a corresponding one of the notches of the pair of the outer rotor segments.

3. The motor-generator as set forth in claim 2, wherein each of the retaining members is made of a magnetic material.

4. The motor-generator as set forth in claim 1, wherein an annular connecting member mechanically connects the inner rotor to the outer rotor, with each of the outer rotor segments offset from the inner rotor by an optimal electrical angle at which the torque generated by the motor-generator 1 becomes maximum.

5. The motor-generator as set forth in claim 4, wherein the connecting member is made of a nonmagnetic material.

6. The motor-generator as set forth in claim 4, wherein the connecting member is made of a magnetic material.

7. The motor-generator as set forth in claim 4, wherein for each of the stator core segments, there are provided a plurality of core end tips each of which is located on one of the radially inner and outer sides of the stator core segment and axially protrudes from one of the axial end surfaces of the stator core segment, and the protruding height of the core end tips is greater than that of end portions of the stator windings, the end portions of the stator windings axially protruding from the axial end surfaces of the stator core segments.

8. The motor-generator as set forth in claim 4, wherein a plurality of protrusions are formed on an inner side surface of the annular connecting member to face the stator windings through an air gap formed therebetween, the protrusions are arranged in the circumferential direction of the stator core at predetermined intervals, and each of the protrusions is made of a permanent magnet or a magnetic material.

9. The motor-generator as set forth in claim 1, wherein each of the stator windings is divided into a plurality of sub-windings, and there is provided a connection control means that controls the electrical connection and separation between the sub-windings of each of the stator windings, thereby selectively forming the stator winding with all or part of the sub-windings.

10. The motor-generator as set forth in claim 1, wherein there are provided a plurality of coils each of which is wound, in a concentrated winding manner, around a radially outer end portion of one of the stator core segments.

11. The motor-generator as set forth in claim 1, wherein for each of the stator core segments, there is fixed a bar-shaped protruding member on an axial end surface of the stator core segment, and the protruding member protrudes radially inward from the stator core segment with an air gap formed between the protruding member and the inner rotor.

12. The motor-generator as set forth in claim 1, wherein the second air gap between the outer rotor and the stator core is set to be less than the first air gap between the inner rotor and the stator core.

* * * * *